(No Model.)
G. L. WENZEL.
APPLE AND GRAPE CRUSHER, &c.
No. 244,961. Patented July 26, 1881.
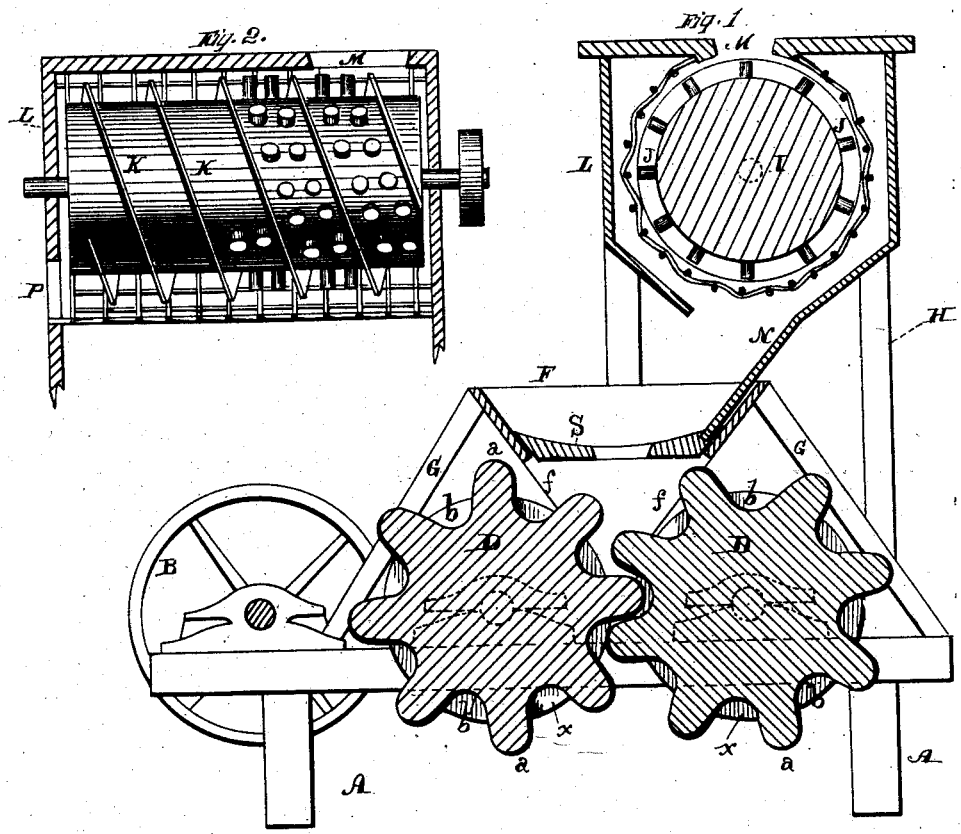
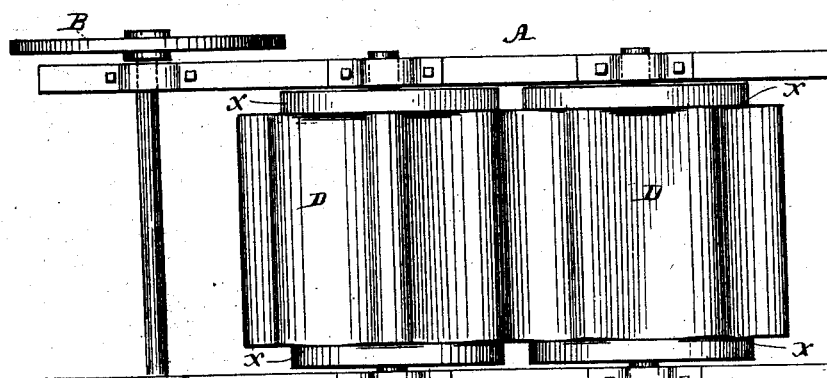
Witnesses
Inventor

UNITED STATES PATENT OFFICE.

GEORG L. WENZEL, OF SAN FRANCISCO, CALIFORNIA.

APPLE AND GRAPE CRUSHER, &c.

SPECIFICATION forming part of Letters Patent No. 244,961, dated July 26, 1881.

Application filed April 30, 1881. (No model.)

*To all whom it may concern:*

Be it known that I, GEORG L. WENZEL, of the city and county of San Francisco, State of California, have invented an Improved Apple and Grape Crusher and Grape-Stemmer; and I hereby declare the following to be a full, clear, and exact description thereof.

My invention relates to a combined apple and grape crusher and grape-stemmer, the features of which are, first, a peculiar construction of the rollers or crushers; second, the position of the hopper or feeder with regard to said rollers; and, third, the novel method of detaching the stems from the grapes and carrying them to one side while the grapes are discharged into the crusher.

My invention consists in the ordinary stand and mechanism to operate the rollers. These rollers are of wood, and are constructed with alternate elevations and depressions, the depressions being made deeper than the periphery of the ends of the rollers, thus forming a basin, whereby the juice of the fruit is prevented from flowing out at the ends, but is carried down with the roller and discharged into a receptacle. The elevations or ridges of one roller are so rounded as to fit exactly the depressions of the other, and vice versa. The hopper is set over the rollers, and its bottom is so shaped as to direct the fruit in small quantities upon the middle of the roller, immediately within the very bottom of the depression, where it will be cut and crushed by the elevation on the other roller. Over the hopper a frame-work is built, which supports a large roller which revolves within a stationary wire-netting. The roller is provided with certain wooden pegs or teeth and a spirally-running flange, the former to catch and tear the stems against the grating, the latter to carry them to one side. The grapes are fed to this roller through an opening above it, and after being stemmed are discharged through the netting into the hopper. All this will hereinafter more fully appear.

Referring to the accompanying drawings, Figure 1 is a longitudinal vertical section. Fig. 2 is a front view of stemming-roller. Fig. 3 is a top view.

Let A represent the stand with its operative mechanism, consisting of the fly-wheel B and gearing-wheels C, for revolving the wooden rollers D, which are provided with the gearing E on their ends, so that their revolution will not depend upon their fluted surfaces. The rollers D are of the shape and appearance of elongated wooden cog-wheels working into one another, as shown, the ridges or elevations *a* being made to engage with and exactly fit the depressions *b* formed by the elevations in the other roller, and vice versa. The depressions *b* in both rollers, formed between the elevations *a*, are sunk below the periphery of the roller itself or its ends. This prevents the juice from escaping at the sides, and causes it to be carried down and discharged below.

The elevation of the periphery at the ends is shown in Figs. 1 and 3 at *x*. These elevations form a peripheral flange around the ends of the rollers and next to the grooved portion, thereby closing the ends of the grooves, forming troughs which contain the juice, prevent it from flowing out over the shafts at the ends, and retaining it until the roller turns sufficiently to discharge at the center.

The hopper F is provided with legs G, and stands on the frame in such position that its mouth will discharge the fruit in small quantities upon the middle of the rollers and immediately into the bottom of the depressions *b*. The hopper F has on the ends of its discharge-openings the flanges *f*, which serve to direct the feed.

The mouth or opening may be constructed of a slot, or when apples are to be crushed a movable plate, S, may be fitted in the bottom of the hopper, with a small hole or opening in it to regulate the supply.

The grape-stemmer is constructed as follows: Supported by the stand A is the frame-work H, on which the roller I is journaled and revolved by appropriate mechanism. The pegs or teeth J are set into the roller I, and extend the whole of its length. A spirally-placed flange, K, is secured to the roller, and extends its whole length.

L is a wire-netting attached to the frame-work, and covering the roller all around, except at the top, where the opening M in the frame admits the grapes upon the roller I. The meshes of the net L are large enough to permit the grapes to fall through, when they are directed by the chute N into the hopper F. When the grapes are put through the opening M they fall upon the roller I, which, in revolving, carries them around, when they are caught between the teeth J and the wire net L and the stems torn off. They then drop through the meshes of the net and are carried into the hopper. The stems are carried be the revolutions of the roller and the spirally-placed flanges K to the end of the roller, being free of the teeth, and are discharged through the opening P in the frame-work.

The object in providing the hopper with a movable bottom is to regulate the supply of apples, the purpose being to allow only a few to be fed at a time, and in this way not overburden the rollers. By this means they do their work effectively. Being made of wood, they do not cut and crush the apples into a mass, but simply cut them in two and press or crush the pulp, leaving the skin comparatively whole.

Having thus described my invention, what I claim as new, and desire to secure by Letters Patent, is—

1. In a fruit-crushing apparatus, the combination, with a fluted crushing-roller, of a rim or flange, $b$, at each end of such roller, whereby each fluting forms a basin and the juice expressed from the fruit is prevented from escaping at the ends of the roller.

2. In combination with the wooden crushing-rollers D, the hopper F, having its bottom provided with the movable plate S, with a central opening, so as to discharge its feed in small quantities upon the middle of the roller and directly upon the bottom of the depression $b$, so as to be crushed by the elevations $a$, substantially as herein described.

3. A grape-stemmer consisting of the revolving roller I, provided with teeth J, and the spirally-placed flange K, and the stationary grating or wire-netting L, substantially as and for the purpose herein described.

4. The combination of the crushing device, consisting of the wooden crushing-rollers D, having the basin-like depression $b$, and the hopper F, with its movable bottom S, with the grape-stemming device, consisting of the roller L, with the teeth J, the spirally-placed flange K, and the stationary wire-netting, substantially as herein described.

In witness whereof I have hereunto set my hand.

GEORG L. WENZEL.

Witnesses:
S. H. NOURSE,
FRANK A. BROOKS.